(No Model.)
S. W. FRANCE.
NURSING BOTTLE.
No. 252,936. Patented Jan. 31, 1882.
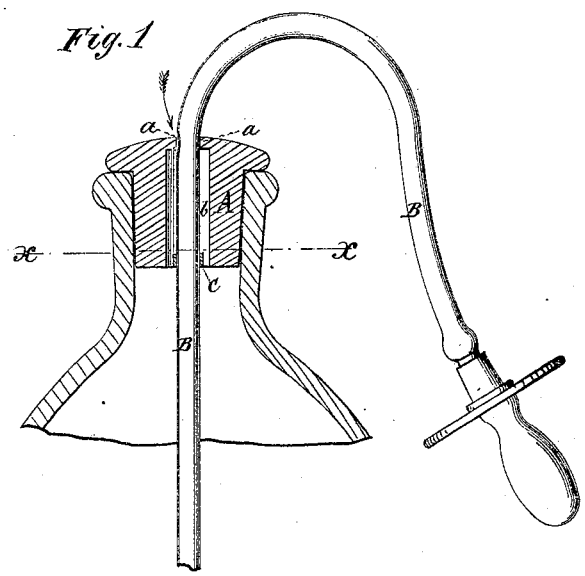
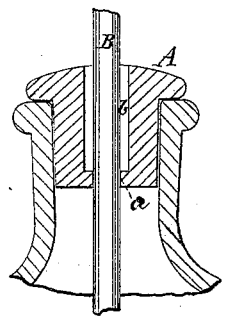
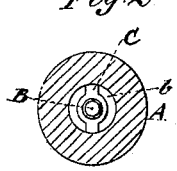
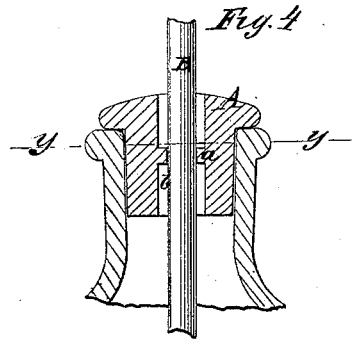
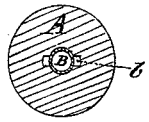
Witnesses:
Sigfrid Lindhagen
Henry Sellman
Inventor:
Simon W. France
by A. W. Almqvist
Attorney

UNITED STATES PATENT OFFICE.

SIMON W. FRANCE, OF BROOKLYN, NEW YORK.

NURSING-BOTTLE.

SPECIFICATION forming part of Letters Patent No. 252,936, dated January 31, 1882.

Application filed April 1, 1880. (No model.)

*To all whom it may concern:*

Be it known that I, SIMON W. FRANCE, of Brooklyn, in the county of Kings and State of New York, have invented a new and useful Improvement in Stopples for Nursing-Bottles, of which the following is a specification.

My invention relates to improved devices for admitting air into a nursing-bottle to fill the vacuum caused by a child's sucking without liability to spill the liquid contained in the bottle.

In a device of this kind patented to me June 24, 1879, the air is admitted through a lateral hole communicating with the central hole, in which the flexible suction-pipe, fitting tightly, acts as air-valve to close by expansion the said air-hole at its junction with the central hole when suction ceases and equilibrium in pressure is restored. The object of my present invention is to produce the same effect without the use of the separate lateral air-hole by admitting the air directly and only through the central hole, in which the pipe maintains the two functions of duct for the egress of milk and valve for the ingress and cut off of air, thereby still further simplifying the construction and cheapening the cost of the manufacture of such stopples.

In the accompanying drawings, Figure 1 represents a vertical central section of my improved stopple. Fig. 2 is a horizontal section of the same, taken on the line x x of Fig. 1. Figs. 3 and 4 are vertical central sections of modifications of the same. Fig. 5 is a horizontal section through the line y y of Fig. 4.

Similar letters of reference indicate corresponding parts.

A is the stopple, and b the hole through the same, in which the nursing-pipe B is inserted. The hole b is bored larger than the outside diameter of the pipe B throughout the entire length of the stopple A, with the exception only of a very short distance at a, where the hole is abruptly decreased in diameter to exactly fit the pipe, so as to form an annular valve-seat, against which the rubber pipe B, in its normal condition, expands, closing the aperture air-tight. When the pipe is flattened or contracted a little in consequence of the vacuum caused by the child's sucking, a small vent is thereby formed between the pipe and the annular seat a, through which the outer air enters the hole b directly, as indicated by the arrows in Fig. 1. In order to make the pipe properly perform its function as air-valve, it is of prime importance that the length of the seat a (measured in the axis of the hole b) and consequent space to be closed by the lateral expansion of the pipe shall not be greater than that it may easily be uncovered to admit air by that contraction of the pipe which is due to the ordinary sucking of the child.

In ordinary stopples for nursing-bottles the pipe fills the hole tightly throughout its entire length, and can therefore not be flattened sufficiently by an ordinary suction to admit air to the bottle.

The valve-seat a may be formed at the lower or inner end of the stopple, as shown in Fig. 3, or at some place intermediate to the upper or outer and lower or inner ends, as shown in Fig. 4; but I prefer to form it at the extreme upper or outer end, as shown in Fig. 1.

The enlargement of the hole b should obviously be cylindrical, so as to form an annular space around the pipe, though it might be effected by cutting one or more longitudinal grooves in the circumference of the hole, as shown in Figs. 4 and 5.

Should the small surface of the valve-seat a be considered as not affording the amount of friction necessary to prevent the pipe B from being slid accidentally in the hole b while the child is nursing, a little bridge-piece, C, punched in substantially the shape shown in Figs. 1 and 2, may be pressed in with its ends tightly in contact with the circumference of the enlargement of the hole b, and the pipe inserted to fit tightly in a central hole of the bridge-piece, thus affording a second bearing-surface for the pipe; but this I have not yet found necessary.

Having thus described my invention, I claim as new and desire to secure by Letters Patent—

1. A stopple, A, for nursing-bottles, in which the hole b is enlarged nearly throughout its entire length, and has a short contracted portion, forming a seat, a, in which a flexible tube may fit tightly, and acts as a valve by expansion to prevent spilling and by contraction to admit air directly to and through the central hole, $b$, without separate lateral vents, substantially as hereinbefore set forth.

2. The combination, with a flexible tube, of a stopple having but a single hole for its passage and without additional vent-openings, which hole is contracted for a portion of its length to fit the tube and enlarged throughout the rest of its length to admit the air on both sides of the contraction, substantially as described.

3. The bridge C, in combination with the nursing-pipe B and with the stopple A, having the enlarged central hole, $b$, and the contraction $a$, substantially as and for the purpose set forth.

SIMON W. FRANCE.

Witnesses:
A. W. ALMQVIST,
SIGFRID LINDHAGEN.